3,265,910
THERMIONIC CONVERTERS
Donald E. Thomas, Pittsburgh, Pa., assignor to Westinghouse Electric Corporation, Pittsburgh, Pa., a corporation of Pennsylvania
Filed Oct. 18, 1962, Ser. No. 231,480
5 Claims. (Cl. 310—4)

The present invention relates to thermionic energy converters, and more particularly to thermionic energy converters for use in high temperature applications requiring long lifetimes.

A major problem in thermionic conversion of heat energy to electrical energy is a loss of cathode material by volatilization. The loss of cathode material is the basic cause for most converter failures. The evaporation loss in the cathode material is an inherent limitation on the lifetime of the converter because of the high operating temperature required, especially in nuclear reactor applications. The rate of evaporation transfer is dependent upon the geometrical configuration, the operating temperatures, materials of construction, and the type and pressure of the gas used between the electrodes of the device. If it is assumed that the maximum allowable rate of evaporation of the cathode is 1 millimeter per year, it can be shown that the ratio of the heat of vaporization to the work function of the cathode material must be greater than 2.5. Since all the elements have ratios considerably less than this, no element meets this requirement. To solve this problem, compounds having acceptably low vapor pressures at the high cathode temperature have been sought. This approach has not been completely satisfactory. Also various gases such as cesium vapor have been used between the electrodes of the converter to increase the lifetime of the converter, but with the attendant disadvantage of decreased efficiency. Since a thermionic converter must possess a useful energy output as well as a useful lifetime:

It is an object of the present invention to provide a new and improved thermionic energy converter having a long lifetime.

It is a further object of the present invention to provide a new and improved thermionic energy converter, suitable for use in a nuclear environment, having a long lifetime.

Broadly, the present invention provides a thermionic converter wherein a gas is placed in the space between the anode and cathode of the converter which forms a volatile compound of the cathode material that is unstable at the cathode temperature; thus depositing material on the cathode surface.

These and other objects of the present invention will become more apparent when considered in view of the following specification and drawings, in which.

Because of the high temperatures at which the cathode of a thermionic converter must operate, we are primarily concerned with refractory metals, that is, tungsten, tantalum, molybdenum and niobium. The process of depositing such metals on a hot surface, for instance, a hot wire, by thermal decomposition of a gaseous compound of the desired metal is well known. For example, zirconium and hafnium have been purified commercially by what is known as the iodide process. In this case, deposition occurs on a filament at a temperature of approximately 1400° C. from $ZrI_4$ or $HfI_4$ gas at pressures of less than 1 torr. The $ZrI_4$ is formed in the same vessel by reaction of $I_2$ with the metal at a low temperature. Similar processes have also been demonstrated with the chlorides, iodides and fluorides of tungsten, tantalum, molybdenum and niobium. In these latter cases, deposition has been accomplished at temperatures of 600° C. to 2200° C. The approximate operating temperatures of a cathode for use in a nuclear reactor would be of the order of 3000° C., with the anode being at a temperature of approximately 1000° C.

Two basic types of thermionic energy converters will be considered herein—the vacuum, closed-spaced, and the plasma-filled forms.

Figure 1:
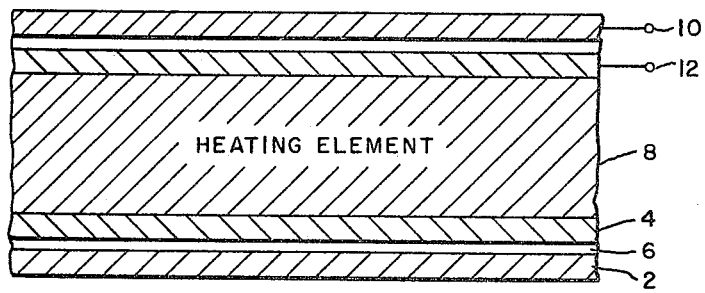
FIGURE 1 is a cross-sectional view of one embodiment of the thermionic converter of the present invention.

Referring to FIG. 1, and considering the vacuum case, a tubular anode 2 has disposed concentrically thereto a tubular cathode 4. An interelectrode space 6 is thus formed between the anode and cathode. Within the cathode 4 a heating element 8, which may constitute a fuel element of a nuclear reactor or other suitable source of thermal energy, is disposed. The spacing between the anode and cathode should be of the order of .0005 inch. The terminals 10 and 12 are connected to the anode 2 and the cathode 4 respectively to serve as terminals from which the electrical energy supplied from the operation of the thermionic converter may be taken. The material of the anode and cathode may be one of the refractory metals; tungsten, for example. In accordance with the present invention, one of the halogens, fluorine, for example, is supplied to the interelectrode space 6 between the anode and cathode. With the temperature of the cathode being of the order of 3000° C., the heat energy being supplied by the heating element 8, an evaporated atom from the tungsten cathode 4 will react with the halogen gas, fluorine. A volatile halide will be formed which will collide with the cathode surface 4 where it will decompose, thus tending to replace any of the evaporated cathode material due to the high temperature energy conversion process. The pressure of the halogen gas required for good electrical characteristics should be such that the mean free path for electrons is equal to or greater than the spacing between the electrodes. In the present case, the pressure should be such as to allow a main free path of at least .0005 inch. For the converter to operate as desired, the anode must be at such a temperature that the volatile halide be stable. It has been found that the condition is met for several of the tungsten halides for an anode temperature of 1000°, which is a temperature compatible with nuclear reactors.

Electrical energy is then taken from the terminals 10 and 12 with current flowing from the anode to the cathode electrode. Tungsten atoms leaving the cathode will deposit on the anode surface where they will react with the fluoride gas, between the electrodes, to form a volatile halide, which will leave the surface of the anode and collide with the cathode surface where it will decompose to resurface the cathode surface. The resurfacing with tungsten will thus increase the lifetime of the device.

Figure 2:
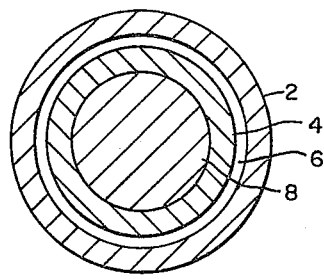
FIG. 2 is an end view of the embodiment of FIG. 1.
Figure 3:
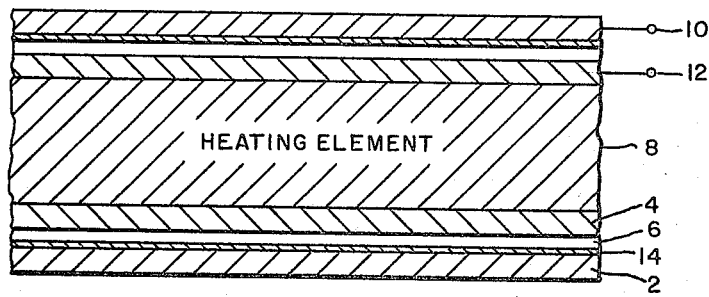
FIG. 3 is another embodiment of the thermionic converter of the present invention.

Referring now to FIG. 3, the structure for the plasma type thermionic converter is substantially the same as that for the vacuum type. A tubular anode 2 is disposed centrically to a tubular cathode 4, with an interelectrode space 6 being formed therebetween. The heating element 8 is disposed within the orifice of the cathode 4. The terminals 10 and 12 are connected electrically to the anode and cathode, respectively, to provide terminals from which electrical energy may be taken. In the use of a plasma converter, cesium vapor is ordinarily introduced in the space 6 between the cathode and anode. The purpose of the cesium, which is partially ionized, is to reduce the space charge that would otherwise oppose the flow of electrons and cut down the efficiency of energy conversion. A second purpose for the cesium is that the cathode surface is covered by the cesium thus lowering the work function of the cathode to enhance the electron emission of the cathode. In the embodiment of FIG. 3, instead of cesium being placed in the space 6 between the cathode and anode, a halogen gas, such as fluoride, is introduced therein. However, if a halogen gas is used it is doubtful that sufficient ionization will occur to constitute a plasma. It is believed in the case of cesium that ions are formed principally by resonance ionization which would cause the ionization potential to be less than the work function of the cathode. In the case of halogens, the ionization potential range from 10.6 to 17.34 and are much higher than any known work functions. Thus, some means must be provided in order to ionize the halogen gas. In a nuclear reactor, because of the gamma radiation, ionization may be provided through this means without the need of an external auxiliary discharge unit which might otherwise be needed. Therefore, the halogen would serve the dual purpose of space charge reduction while also protecting the cathode from evaporation. The deposition of material on the cathode surface would be accomplished by the same mechanism as described in reference to the converter of FIGS. 1 and 2.

The use of a halogen gas introduces in certain instances the problem of reaction with the anode material. Since the noble metals, gold and platinum, in the form of plating, do not form stable halides at the anode temperature, approximately 1000° K., as previously mentioned, and the reaction at lower temperatures, where the halides are stable, are slow enough to cause no difficulty, a coating 14 of a noble metal may be added to the inside surface of the anode 2. The coating may be plated onto the tungsten anode as the layer 14, thus retarding reaction of the anode with the halogen gas in the interelectrode space. A noble metal layer may be used in either of the vacuum or plasma type converters, although the layer 14 is shown only in FIG. 3. Another approach to inhibit reaction with the anode material would be to select a material which exhibits a slow reaction with the halogen gas to form a volatile halide which decomposes on the cathode. Materials such as iron, nickel, chromium or silver have this characteristic and could be used as a coating for the inside surface of the anode. If the material has a relatively high vapor pressure, as do these materials, at the cathode temperature it will not build up sufficient concentration to be objectionable.

Although the present invention has been described with a certain degree of particularity, it should be understood that the present disclosure has been made only by way of example and that numerous changes in the details of construction and the combination and arrangement of parts and materials may be resorted to without departing from the scope and the spirit of the present invention.

I claim as my invention:

1. In a nuclear reactor heat source, a thermionic energy converter comprising, a tubular anode of a refractory material and a tubular cathode of a heavy refractory metal which vaporizes at the temperature of operation disposed within said anode and adjacent the heat source, with a space being formed between said anode and cathode, said space being filled only with a halogen gas which forms a volatile compound of the cathode metal which is unstable at the cathode temperature so as to deposit metal on the cathode surface.

2. A thermionic heat to electrical energy converter operative with a heat source comprising, a tubular anode of a refractory material coated on the inside with a noble metal and a tubular cathode of a heavy refractory metal which vaporizes at the temperature of operation to receive heat from the heat source and being disposed within said anode, with a space being formed between said anode and cathode, said space being filled only with a halogen gas which forms a volatile compound of the cathode metal which is unstable at the cathode temperature so as to deposit metal on the cathode surface.

3. In a nuclear reactor heat source, a thermionic converter comprising, a tubular anode of a refractory material coated on the inside with a noble metal and a tubular cathode of a heavy refractory metal which vaporizes at the temperature of operation disposed within said anode and adjacent the heat source, with a space being formed between said anode and cathode, said space being filled only with a halogen gas which forms a volatile compound of the cathode metal which is unstable at the cathode temperature so as to deposit metal on the cathode surface.

4. A thermionic energy converter operative with a radioactive heat source comprising, a cathode of a heavy refractory metal which vaporizes at the temperature of operation disposed adjacent said radioactive heat source, an anode of a refractory material surrounding said cathode, with a space being formed between said anode and cathode, said space being filled only with a halogen gas which forms a volatile compound of the cathode metal which is unstable at the cathode temperature so as to deposit metal on the cathode surface.

5. In a nuclear reactor heat source, a thermionic energy converter comprising, a cathode of a heavy refractory metal which vaporizes at the temperature of operation disposed adjacent the heat source, an anode of a refractory material surrounding said cathode, with a space being formed between said anode and cathode, said space being filled only with a halogen gas which forms a volatile compound of the cathode metal which is unstable at the cathode temperature so as to deposit metal on the cathode surface.

References Cited by the Examiner

UNITED STATES PATENTS

| | | | |
|---|---|---|---|
| 2,980,819 | 4/1961 | Feaster | 310—4 |
| 3,054,914 | 9/1962 | Hatsopoulas et al. | 310—4 |
| 3,093,567 | 6/1963 | Jablonski et al. | 176—52 X |

FOREIGN PATENTS 232,855   2/1961   Australia.

OTHER REFERENCES

Nucleonics, July 1959 (volume 17, No. 7), pages 49–55.

References Cited by the Applicant

UNITED STATES PATENTS 3,218,487   11/1965   Pidd et al.

REUBEN EPSTEIN, *Primary Examiner.*

CARL D. QUARFORTH, *Examiner.*